(12) United States Patent
Griffin et al.

(10) Patent No.: US 8,315,672 B2
(45) Date of Patent: Nov. 20, 2012

(54) PORTABLE ELECTRONIC DEVICE AND METHOD OF CONTROLLING SAME

(75) Inventors: Jason Tyler Griffin, Kitchener (CA); Todd Andrew Wood, Guelph (CA); Mihal Lazaridis, Waterloo (CA); Harry Richmond Major, Waterloo (CA); David Paul Yach, Waterloo (CA)

(73) Assignee: Research In Motion Limited, Waterloo (CA)

( * ) Notice: Subject to any disclaimer, the term of this patent is extended or adjusted under 35 U.S.C. 154(b) by 727 days.

(21) Appl. No.: 12/325,402

(22) Filed: Dec. 1, 2008

(65) Prior Publication Data

US 2010/0137031 A1 Jun. 3, 2010

(51) Int. Cl.
*H04M 1/00* (2006.01)
*H04B 1/38* (2006.01)
(52) U.S. Cl. ........................................ 455/566; 345/173
(58) Field of Classification Search .................. 455/566; 345/173
See application file for complete search history.

(56) References Cited

U.S. PATENT DOCUMENTS

| | | | |
|---|---|---|---|
| 2006/0244735 A1* | 11/2006 | Wilson | 345/173 |
| 2007/0120835 A1 | 5/2007 | Sato | |
| 2007/0146337 A1* | 6/2007 | Ording et al. | 345/173 |
| 2008/0316183 A1* | 12/2008 | Westerman et al. | 345/173 |

OTHER PUBLICATIONS

European Patent Application No. 08170345.6, Search Report dated Apr. 20, 2009.

* cited by examiner

*Primary Examiner* — John Poos
(74) *Attorney, Agent, or Firm* — Geoffrey deKleine; Borden Ladner Gervais LLP

(57) ABSTRACT

A method of controlling a portable electronic device that has a touch screen display includes providing a graphical user interface on a touch screen display, detecting a touch event at a first location on the touch screen display, providing a navigation indicator in the graphical user interface in response to detecting the touch event at the first location, and in response to detecting movement of the touch event from the first location to a second location while touch contact is maintained on the touch screen display, changing the position of the navigation indicator in the graphical user interface by a distance that is greater than a distance of movement of the touch event on the touch screen display, a direction of change of position of the navigation indicator is based on a direction of movement of the touch event on the touch screen display.

13 Claims, 12 Drawing Sheets

PORTABLE ELECTRONIC DEVICE AND METHOD OF CONTROLLING SAME

FIELD OF TECHNOLOGY

The present disclosure relates to portable electronic devices including touch screen display devices and the control of such devices for user interaction.

BACKGROUND

Electronic devices, including portable electronic devices, have gained widespread use and can provide a variety of functions including, for example, telephonic, electronic messaging and other personal information manager (PIM) application functions. Portable electronic devices can include several types of devices including mobile stations such as simple cellular telephones, smart telephones, wireless PDAs, and laptop computers with wireless 802.11 or Bluetooth capabilities. These devices run on a wide variety of networks from data-only networks such as Mobitex and DataTAC to complex voice and data networks such as GSM/GPRS, CDMA, EDGE, UMTS and CDMA2000 networks.

Portable electronic devices such as PDAs or smart telephones are generally intended for handheld use and ease of portability. Smaller devices are generally desirable for portability. A touch screen display for input and output is particularly useful on such portable devices as such handheld devices are small and are therefore limited in space available for user input and output devices. Further, the screen content on the touch screen display devices can be modified depending on the functions and operations being performed. Even still, these devices have a limited area for rendering content on the touch screen display and for rendering features or icons, for example, for user interaction. With continued demand for decreased size of portable electronic devices, touch screen displays continue to decrease in size.

Improvements in touch screen devices are therefore desirable.

BRIEF DESCRIPTION OF THE DRAWINGS

Embodiments of the present disclosure will now be described, by way of example only, with reference to the attached Figures, wherein.

DETAILED DESCRIPTION

Figure 1:
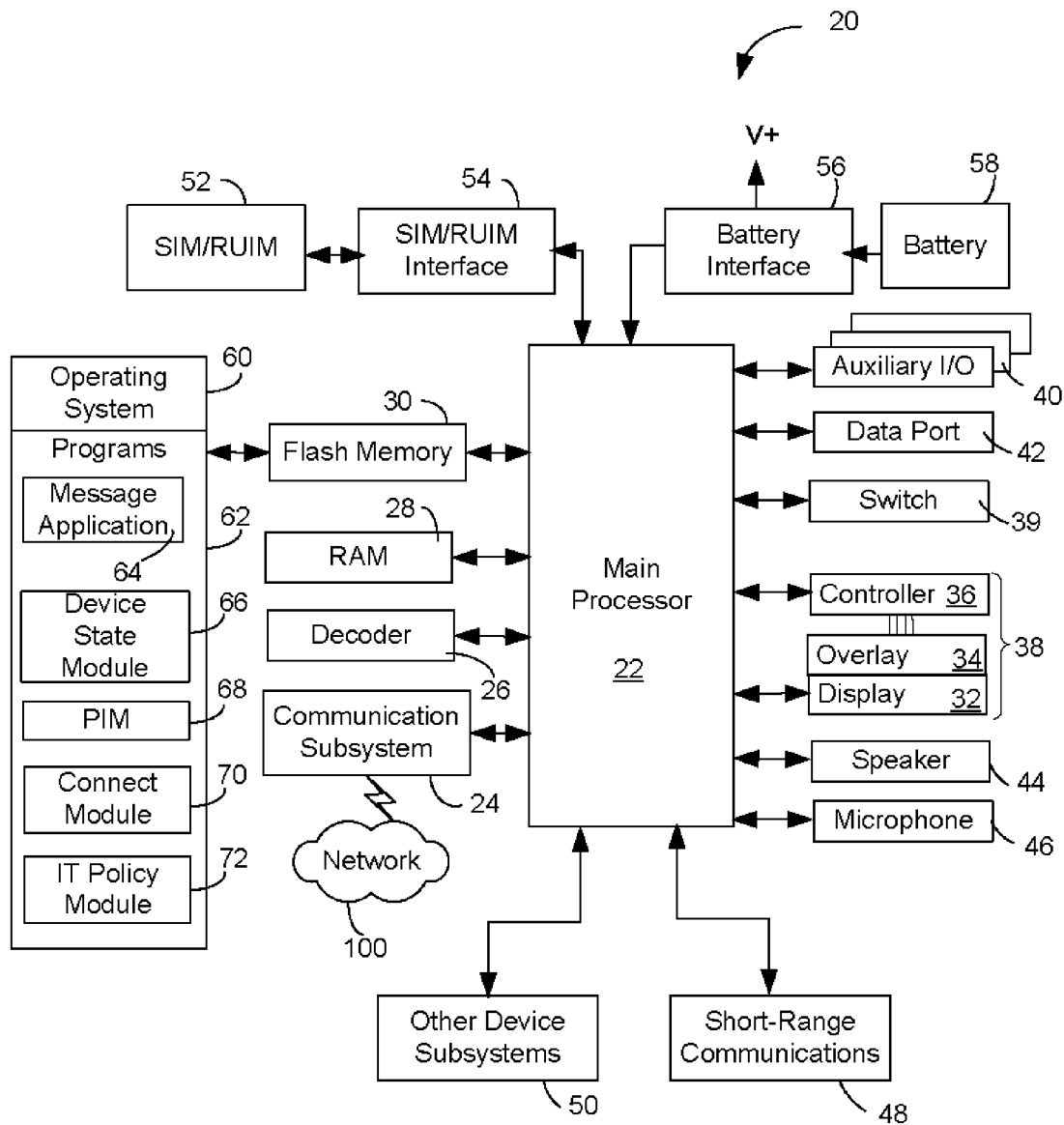
FIG. 1 is a block diagram of a portable electronic device according to one example.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to a portable electronic device including a touch screen display and control of the portable electronic device. Examples of portable electronic devices include mobile, or handheld, wireless communication devices such as pagers, cellular phones, cellular smart-phones, wireless organizers, personal digital assistants, wirelessly enabled notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). The portable electronic device may also be a portable device without wireless communication capabilities as a handheld electronic game device, digital photograph album, digital camera and the like.

Referring first to FIG. 1, there is shown therein a block diagram of an example of an embodiment of a portable electronic device 20. The portable electronic device 20 includes a number of components such as the processor 22 that controls the overall operation of the portable electronic device 20. Communication functions, including data and voice communications, are performed through a communication subsystem 24. Data received by the portable electronic device 20 can be decompressed and decrypted by a decoder 26, operating according to any suitable decompression techniques (e.g. YK decompression, and other known techniques) and encryption techniques (e.g. using an encryption technique such as Data Encryption Standard (DES), Triple DES, or Advanced Encryption Standard (AES)). The communication subsystem 24 receives messages from and sends messages to a wireless network 100. In this example of an embodiment of the portable electronic device 20, the communication subsystem 24 is configured in accordance with the Global System for Mobile Communication (GSM) and General Packet Radio Services (GPRS) standards. The GSM/GPRS wireless network is used worldwide. New standards such as Enhanced Data GSM Environment (EDGE) and Universal Mobile Telecommunications Service (UMTS) are believed to have similarities to the network behavior described herein, and it will also be understood by persons skilled in the art that the embodiments described herein are intended to use any other suitable standards that are developed in the future. The wireless link connecting the communication subsystem 24 with the wireless network 100 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 100 associated with portable electronic device 20 is a GSM/GPRS wireless network in one example implementation, other wireless networks may also be associated with the portable electronic device 20 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA1000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The processor 22 also interacts with additional subsystems such as a Random Access Memory (RAM) 28, a flash memory 30, a display 32 with a touch-sensitive overlay 34 that together make up a touch screen display 38. The processor 22 interacts with the touch-sensitive overlay via an electronic controller 36. The processor 22 also interacts with a switch 39, an auxiliary input/output (I/O) subsystem 40, a data port 42, a speaker 44, a microphone 46, short-range communications 48 and other device subsystems 50.

Some of the subsystems of the portable electronic device 20 perform communication-related functions, whereas other subsystems may provide "resident" or on-device functions. By way of example, the display 32 and the touch-sensitive overlay 34 may be used for both communication-related functions, such as entering a text message for transmission over the network 100, and device-resident functions such as a calculator or task list.

The portable electronic device 20 can send and receive communication signals over the wireless network 100 after network registration or activation procedures have been completed. Network access is associated with a subscriber or user of the portable electronic device 20. To identify a subscriber according to the present embodiment, the portable electronic device 20 uses a SIM/RUIM card 52 (i.e. Subscriber Identity Module or a Removable User Identity Module) inserted into a SIM/RUIM interface 54 for communication with a network such as the network 100. The SIM/RUIM card 52 is one type of a conventional "smart card" that can be used to identify a subscriber of the portable electronic device 20 and to personalize the portable electronic device 20, among other things. In the present embodiment the portable electronic device 20 is not fully operational for communication with the wireless network 100 without the SIM/RUIM card 52. By inserting the SIM/RUIM card 52 into the SIM/RUIM interface 54, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 52 includes a processor and memory for storing information. Once the SIM/RUIM card 52 is inserted into the SIM/RUIM interface 54, it is coupled to the processor 22. In order to identify the subscriber, the SIM/RUIM card 52 can include some user parameters such as an International Mobile Subscriber Identity (IMSI). An advantage of using the SIM/RUIM card 52 is that a subscriber is not necessarily bound by any single physical portable electronic device. The SIM/RUIM card 52 may store additional subscriber information for a portable electronic device as well, including datebook (or calendar) information and recent call information. Alternatively, user identification information can also be programmed into the flash memory 30.

The portable electronic device 20 is a battery-powered device and includes a battery interface 56 for receiving one or more rechargeable batteries 58. In at least some embodiments, the battery 58 can be a smart battery with an embedded microprocessor. The battery interface 56 is coupled to a regulator (not shown), which assists the battery 58 in providing power V+ to the portable electronic device 20. Although current technology makes use of a battery, future technologies such as micro fuel cells may provide the power to the portable electronic device 20.

The portable electronic device 20 also includes an operating system 60 and software components 62 which are described in more detail below. The operating system 60 and the software components 62 that are executed by the processor 22 are typically stored in a persistent store such as the flash memory 30, which may alternatively be a read-only memory (ROM) or similar storage element (not shown). Those skilled in the art will appreciate that portions of the operating system 60 and the software components 62, such as specific software applications 64, 66, 68 and 72, or parts thereof, may be temporarily loaded into a volatile store such as the RAM 28. Other software components can also be included, as is well known to those skilled in the art.

The subset of software components 62 that control basic device operations, including data and voice communication applications, will normally be installed on the portable electronic device 20 during its manufacture. Other software applications include a message application 64 that can be any suitable software program that allows a user of the portable electronic device 20 to send and receive electronic messages. Various alternatives exist for the message application 64 as is well known to those skilled in the art. Messages that have been sent or received by the user are typically stored in the flash memory 30 of the portable electronic device 20 or some other suitable storage element in the portable electronic device 20. In at least some embodiments, some of the sent and received messages may be stored remotely from the device 20 such as in a data store of an associated host system that the portable electronic device 20 communicates with.

The software components 62 can further include a device state module 66, a Personal Information Manager (PIM) 68, and other suitable modules (not shown). The device state module 66 provides persistence, i.e. the device state module 66 ensures that important device data is stored in persistent memory, such as the flash memory 30, so that the data is not lost when the portable electronic device 20 is turned off or loses power.

The PIM 68 includes functionality for organizing and managing data items of interest to the user, such as, but not limited to, e-mail, contacts, calendar events, voice mails, appointments, and task items. The PIM 68 has the ability to send and receive data items via the wireless network 100. PIM data items may be seamlessly integrated, synchronized, and updated via the wireless network 100 with the portable electronic device subscriber's corresponding data items stored and/or associated with a host computer system. This functionality creates a mirrored host computer on the portable electronic device 20 with respect to such items. This can be particularly advantageous when the host computer system is the portable electronic device subscriber's office computer system.

The software components 62 also includes a connect module 70, and an information technology (IT) policy module 72. The connect module 70 implements the communication protocols that are required for the portable electronic device 20 to communicate with the wireless infrastructure and any host system, such as an enterprise system, that the portable electronic device 20 is authorized to interface with.

The connect module 70 includes a set of APIs that can be integrated with the portable electronic device 20 to allow the portable electronic device 20 to use any number of services associated with the enterprise system. The connect module 70 allows the portable electronic device 20 to establish an end-to-end secure, authenticated communication pipe with the host system. A subset of applications for which access is provided by the connect module 70 can be used to pass IT policy commands from the host system to the portable electronic device 20. This can be done in a wireless or wired manner. These instructions can then be passed to the IT policy module 72 to modify the configuration of the device 20. Alternatively, in some cases, the IT policy update can also be done over a wired connection.

Other types of software applications can also be installed on the portable electronic device 20. These software applications can be third party applications, which are added after the manufacture of the portable electronic device 20. Examples of third party applications include games, calculators, utilities, etc.

The additional applications can be loaded onto the portable electronic device 20 through at least one of the wireless network 100, the auxiliary I/O subsystem 40, the data port 42, the short-range communications subsystem 48, or any other suitable device subsystem 50. This flexibility in application installation increases the functionality of the portable electronic device 20 and may provide enhanced on-device functions, communication-related functions, or both. For example, secure communication applications may enable electronic commerce functions and other such financial transactions to be performed using the portable electronic device 20.

The data port 42 enables a subscriber to set preferences through an external device or software application and extends the capabilities of the portable electronic device 20 by providing for information or software downloads to the portable electronic device 20 other than through a wireless communication network. The alternate download path may, for example, be used to load an encryption key onto the portable electronic device 20 through a direct and thus reliable and trusted connection to provide secure device communication.

The data port 42 can be any suitable port that enables data communication between the portable electronic device 20 and another computing device. The data port 42 can be a serial or a parallel port. In some instances, the data port 42 can be a USB port that includes data lines for data transfer and a supply line that can provide a charging current to charge the battery 58 of the portable electronic device 20.

The short-range communications subsystem 48 provides for communication between the portable electronic device 20 and different systems or devices, without the use of the wireless network 100. For example, the short-range communications subsystem 48 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download is processed by the communication subsystem 24 and input to the processor 22. The processor 22 then processes the received signal for output to the display 32 or alternatively to the auxiliary I/O subsystem 40. A subscriber may also compose data items, such as e-mail messages, for example, using the touch-sensitive overlay 34 on the display 32 that are part of the touch screen display 38, and possibly the auxiliary I/O subsystem 40. The auxiliary I/O subsystem 40 may include devices such as: a mouse, track ball, infrared fingerprint detector, or a roller wheel with dynamic button pressing capability. A composed item may be transmitted over the wireless network 100 through the communication subsystem 24.

For voice communications, the overall operation of the portable electronic device 20 is substantially similar, except that the received signals are output to the speaker 44, and signals for transmission are generated by the microphone 46. Alternative voice or audio I/O subsystems, such as a voice message recording subsystem, can also be implemented on the portable electronic device 20. Although voice or audio signal output is accomplished primarily through the speaker 44, the display 32 can also be used to provide additional information such as the identity of a calling party, duration of a voice call, or other voice call related information.

Figure 2:
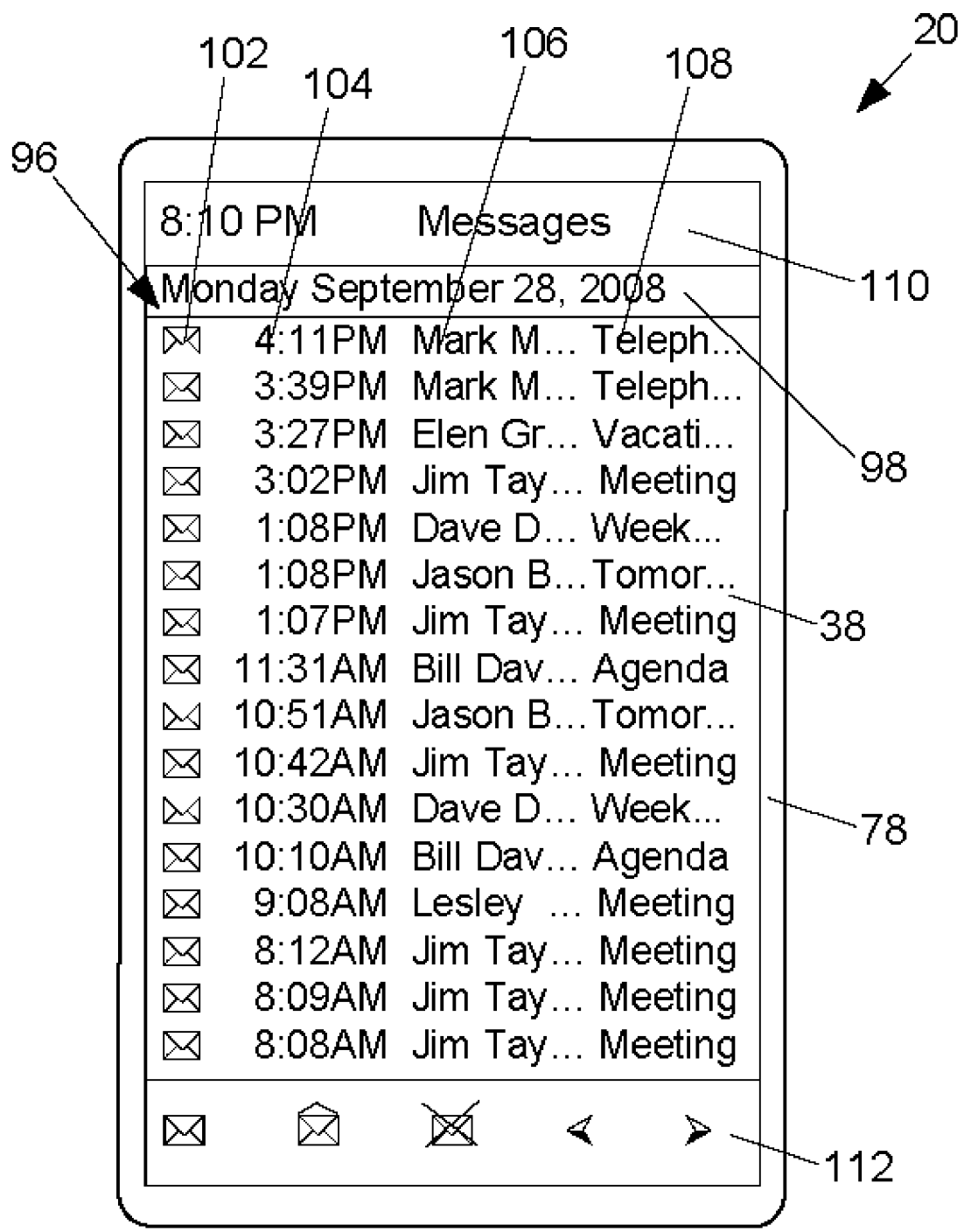
FIG. 2 is a front view of an example portable electronic device shown in a portrait orientation.

Reference is now made to FIG. 2, which shows a front view of an example portable electronic device 20 in portrait orientation. The portable electronic device 20 includes a housing 74 that houses the internal components that are shown in FIG. 1 and frames the touch screen display 38 such that the touch screen display 38 is exposed for user-interaction therewith when the portable electronic device 20 is in use.

Figure 3:
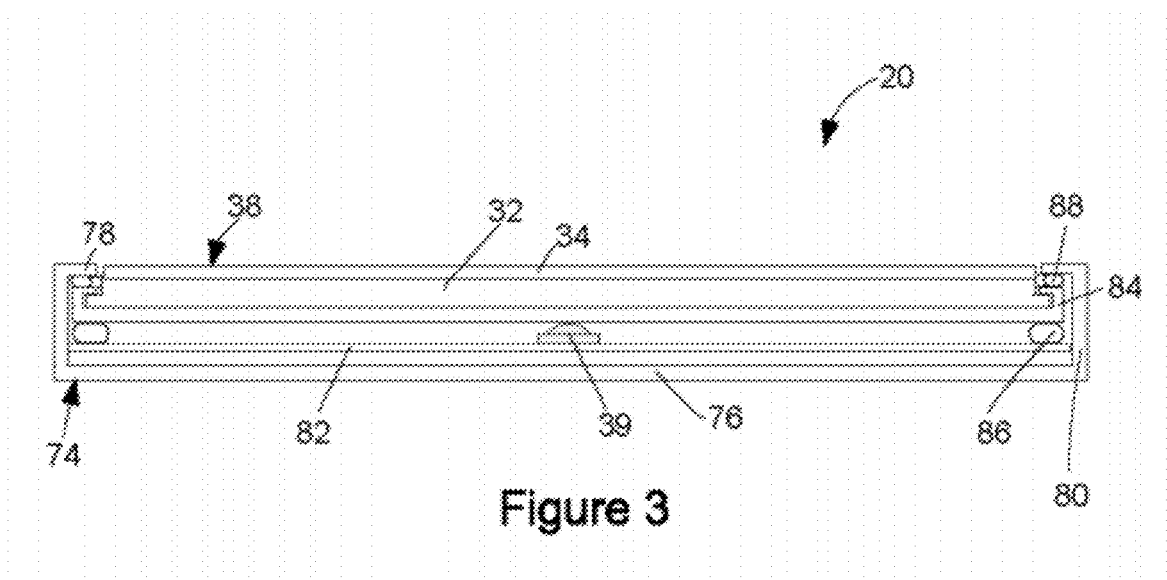
FIG. 3 is a simplified sectional side view of the portable electronic device of FIG. 2 (not to scale), with a switch shown in a rest position.

As best shown in FIG. 3, the housing 74 includes a back 76, a frame 78, which frames the touch screen display 38, sidewalls 80 that extend between and generally perpendicular to the back 76 and the frame 78, and a base 82 that is spaced from and generally parallel to the back 76. The base 82 can be any suitable base and can include, for example, a printed circuit board or flex circuit board. The back 76 includes a plate (not shown) that is releasably attached for insertion and removal of, for example, the battery 58 and the SIM/RUIM card 52 described above. It will be appreciated that the back 76, the sidewalls 80 and the frame 78 can be injection molded, for example. In the example of the portable electronic device 20 shown in FIG. 2, the frame 78 is generally rectangular with rounded corners although other shapes are possible.

The display 32 and the overlay 34 can be supported on a support tray 84 of suitable material such as magnesium for providing mechanical support to the display 32 and overlay 34. The display 32 and overlay 34 are biased away from the base 82, toward the frame 78 by biasing elements 86 such as gel pads between the support tray 84 and the base 82. Compliant spacers 88, which can also be in the form of gel pads for example, are located between an upper portion of the support tray 84 and the frame 78. The touch screen display 38 is moveable within the housing 74 as the touch screen display 38 can be moved toward the base 82, thereby compressing the biasing elements 86. The touch screen display 38 can also be pivoted within the housing 74 with one side of the touch screen display 38 moving toward the base 82, thereby compressing the biasing elements 86 on the same side of the touch screen display 38 that moves toward the base 82.

In the present example, the switch 39 is supported on one side of the base 82 which can be printed circuit board while the opposing side provides mechanical support and electrical connection for other components (not shown) of the portable electronic device 20. The switch 39 can be located between the base 82 and the support tray 84. The switch 39, which can be a mechanical dome-type switch, for example, can be located in any suitable position such that displacement of the touch screen display 38 resulting from a user pressing the touch screen display 38 with sufficient force to overcome the bias and to overcome the actuation force for the switch 39, depresses and actuates the switch 39. In the present embodiment the switch 39 is in contact with the support tray 84. Thus, depression of the touch screen display 38 by user application of a force thereto, causes actuation of the switch 39, thereby providing the user with a positive tactile quality during user interaction with the user interface of the portable electronic device 20. The switch 39 is not actuated in the rest position shown in FIG. 3, absent applied force by the user. It will be appreciated that the switch 39 can be actuated by pressing anywhere on the touch screen display 38 to cause movement of the touch screen display 38 in the form of movement parallel with the base 82 or pivoting of one side of the touch screen display 38 toward the base 82. The switch 39 is connected to the processor 22 and can be used for further input to the processor when actuated. Although a single switch is shown any suitable number of switches can be used.

In the example screen shown in FIG. 2, the touch screen display 38 includes a list of messages 96 sent from the portable electronic device 20 and received at the message application 64 (shown in FIG. 1). The list of messages 96 can include any suitable message types such as email messages, Short Message Service (SMS) messages, Multimedia Messaging Service (MMS) messages, Personal Identification Number (PIN messages), and any other suitable message types as well as any combination of message types. In the present example, the list is in time and date order and includes a date field 98 under which all messages sent and received on the date indicated in the date field 98 are listed. Each message in the list of messages 96 sent and received includes a number of fields for identification. These fields can include, for example, a message type field 102, a timestamp field 104, a correspondent field 106, and a subject field 108. It will be appreciated that other suitable information fields are possible as further suitable fields can be included in the list of messages 96 or suitable fields can be excluded from the list of messages 96. Regardless of the fields included, the list of messages can be provided in the message application 64, for example, upon execution of the message application 64 resulting from receipt of a user-selection of, for example, the message application 64 from a menu list of selectable applications. The list of messages 96 is provided in one portion of the graphical user interface while a banner 110 is located above the list of messages 96 in the orientation shown in FIG. 2. A button bar 112, for example, is provided below the list of messages 96 for opening, closing, deleting, or navigating between messages 96.

The touch screen display 38 can be any suitable touch screen display such as a capacitive touch screen display, resistive touch screen display or any other suitable touch screen display. For example purposes, the touch screen display is a capacitive touch screen display 38 and includes the display 32 and the touch-sensitive overlay 34, in the form of a capacitive touch-sensitive overlay 34. It will be appreciated that the capacitive touch-sensitive overlay 34 includes a number of layers in a stack and is fixed to the display 32 via a suitable optically clear adhesive. The layers can include, for example a substrate fixed to the LCD display 32 by a suitable adhesive, a ground shield layer, a barrier layer, a pair of capacitive touch sensor layers separated by a substrate or other barrier layer, and a cover layer fixed to the second capacitive touch sensor layer by a suitable adhesive. The capacitive touch sensor layers can be any suitable material such as patterned indium tin oxide (ITO).

The X and Y location of a touch event are both determined with the X location determined by a signal generated as a result of capacitive coupling with one of the touch sensor layers and the Y location determined by the signal generated as a result of capacitive coupling with the other of the touch sensor layers. Each of the touch-sensor layers provides a signal to the controller 36 as a result of capacitive coupling with a suitable object such as a finger of a user or a conductive object held in a bare hand of a user resulting in a change in the electric field of each of the touch sensor layers. The signals represent the respective X and Y location of touch values. It will be appreciated that other attributes of the user's touch on the touch screen display 38 can be determined. For example, the size and the shape of the touch on the touch screen display 38 can be determined in addition to the location (X and Y values) based on the signals received at the controller 36 from the touch sensor layers.

Referring still to FIG. 2, it will be appreciated that a user's touch on the touch screen display 38 is determined by determining the X and Y location of touch and user-selected input is determined based on the X and Y location of touch and the application executed by the processor 22. In the example screen shown in the view of FIG. 2, the application provides the list of messages 96 and each message is selectable for opening for viewing content.

Figure 4:
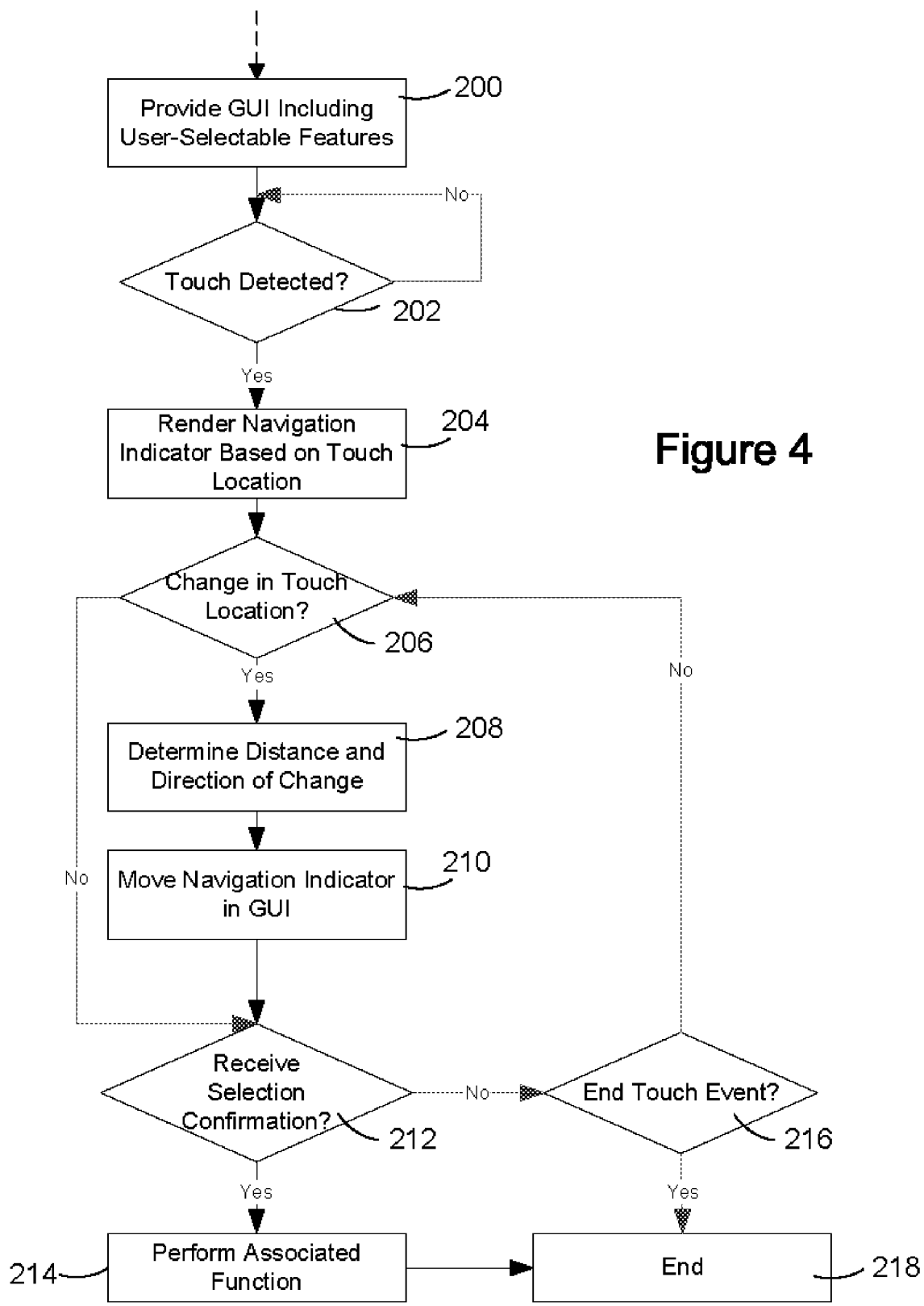
FIG. 4 is a flow chart showing a method for controlling a portable electronic device according to an example embodiment.
Figure 5:
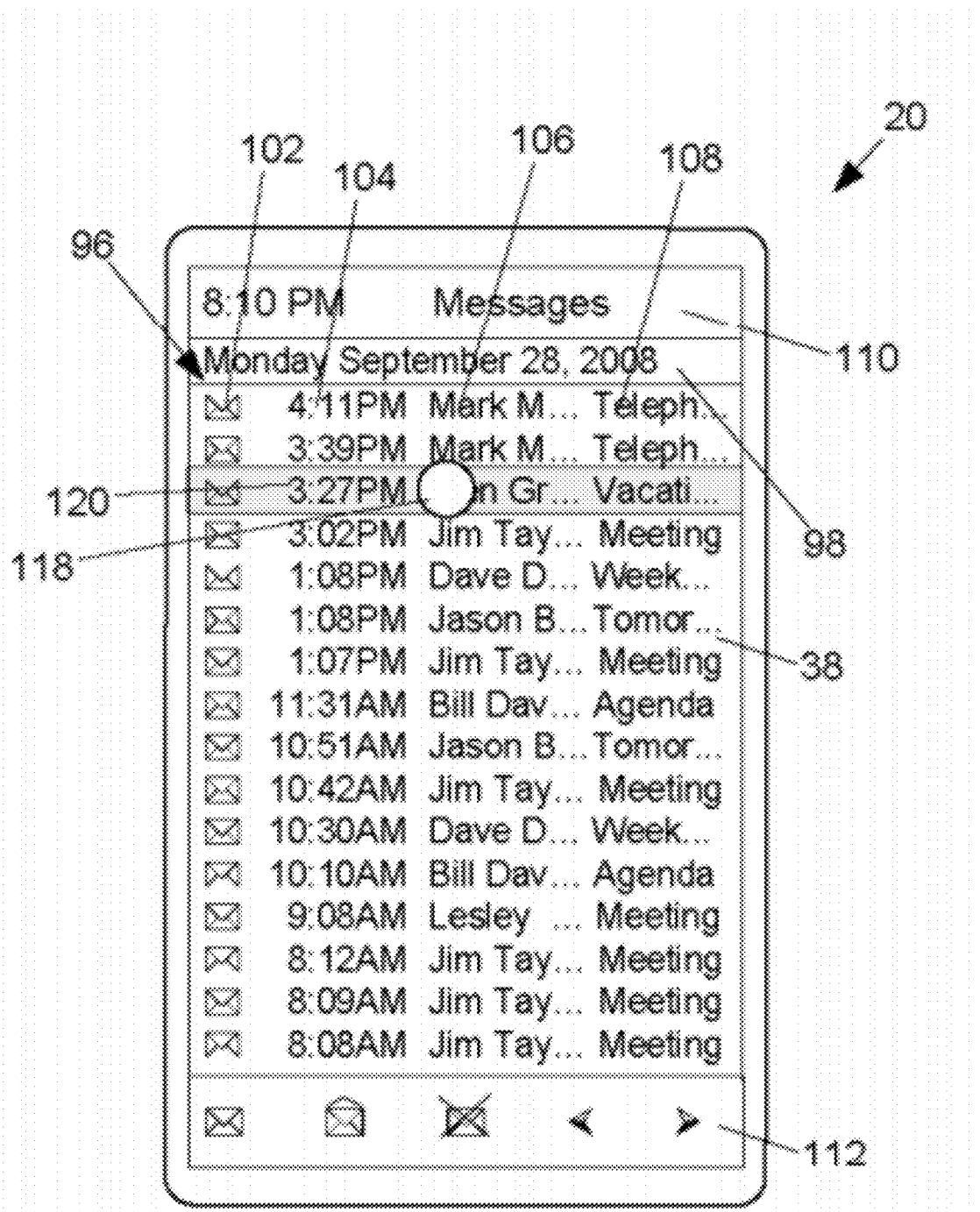
FIGS. 5 to 8 are front views of the portable electronic device of FIG. 2 illustrating an example of a graphical user interface performing steps of the method of FIG. 4.

Reference is now made to FIG. 4 to describe a method of controlling a portable electronic device in accordance with one embodiment. It will be appreciated that the steps of FIG. 4 can be carried out by routines or subroutines of software executed by the processor 22. Coding of software for carrying out such steps is well within the scope of a person of ordinary skill in the art having regard to the present description.

In general, the method of controlling the portable electronic device 20 having the touch screen display 38 includes providing a graphical user interface on the touch screen display 38, detecting a touch event at a first location on the touch screen display 38, providing a navigation indicator in the graphical user interface in response to detecting the touch event at the first location, and in response to detecting movement of the touch event from the first location to a second location while touch contact is maintained on the touch screen display, changing the position of the navigation indicator in the graphical user interface by a distance that is greater than a distance of movement of the touch event on the touch screen display, a direction of change of position based on a direction of movement of the touch event.

A graphical user interface is displayed on the display 32 and includes user-selectable features such as a list of messages, a list of contacts, a list of calendar events, thumbnail images, text or any other suitable feature or features (step 200). The graphical user interface can be provided in any suitable application, such as the message application, 64 or any other suitable application.

A touch event is detected upon user touching of the touch screen display 38. Such a touch event can be determined upon a user touch at the touch screen display 38 for selection of, for example, a feature or features, such as a message, text, or other feature. The processor 22 awaits detection of a touch event and, as shown if no touch event is detected, the touch screen display 38 is continually monitored for a touch event. Signals are sent from the touch-sensitive overlay 34 to the controller 36 when a touch event, such as a finger touching the touch screen display, is detected. Thus, the touch event is detected and the X and Y location of the touch are determined (step 202). A navigation indicator such as a cursor or highlighting of a feature on or proximal the location of touch is rendered (step 204). The navigation indicator can be rendered at the point of contact of the user's finger with the touch-sensitive overlay 34 or can be rendered near the point of contact based on a predetermined offset, for example, to compensate for a difference between an actual location of touch and a target location. A predetermined offset, for example, can be determined based on prior calibration of the actual location of touch and a target on the touch screen display 38. Thus, the navigation indicator is rendered at a location based on the location of touch.

Next it is determined if there is a change in the location of touch (step 206) during the touch event. The X and Y location of touch is determined and compared to the previously determined X and Y location, and any change in the X and Y location is resolved. If there is no change in the X and Y location of the touch, or a change that is below a minimum threshold, the process proceeds to step 212 where it is determined if a confirmation of selection is received (step 206). The location of the touch is thereby monitored to determine any changes during the touch event.

If it is determined at step 206 that there is a change in the location of the touch during the touch event, the distance of change is determined based on the difference between the previously determined X and Y location and the new X and Y location of touch. The direction of change is also determined based on the same X and Y values (step 208). The navigation indicator is then moved relative to the graphical user interface (GUI) by, for example, scrolling highlighting through a list of features or moving a cursor through text (step 210). The navigation indicator is moved a distance in relation to the graphical user interface that is greater than the distance of movement of the touch event on the touch screen display 38 as determined at step 208 and the direction of movement is dependent on the direction of movement of the location of touch. Thus, for example, a cursor may move in the direction of the movement of the location of touch at a distance greater than the distance traveled by the user's finger during the touch event. Alternatively, highlighting may move generally in one of two directions to scroll through a list based on a component of the direction of change of location of touch. In yet another alternative, highlighting may move in one of four directions through icons based on components of the direction of change of the location of touch.

Next, it is determined if confirmation of selection is received in the form of a signal from the switch 39 resulting from depression of the touch screen display 38 with sufficient force to cause movement of the touch screen display 39 in the form of pivoting, against the bias of the touch screen display 39 and against the actuation force of the switch 39, to thereby actuate the switch 39 (step 212). Absent actuation of the switch 39 caused by depression of the touch screen display 38, the process proceeds to step 216 where it is determined if the touch event has ended. If the user lifts his or her finger from the touch screen display 39, the end of the touch contact is detected and the process ends (step 218). If, on the other hand, it is determined that touch contact is maintained, the touch event has not ended, the process proceeds to step 206 where a further change in the location of touch can be detected. If the switch 39 is actuated, however, the process proceeds to step 214 where a function associated with the location of the navigation indicator at the time of release of the switch 39 and therefore at the time the signal is sent from the switch 39 to the processor 22, is performed. The function performed is therefore dependent on the location of the navigation indicator at the time the switch 39 is released and on the application and graphical user interface in which the navigation indicator is provided. The associated function can be, for example, selection of a feature from a list to display further details, selection of a thumbnail image for display, selection of a location within text for entry or deletion of characters or any other suitable function.

It will be appreciated that the process shown and described with reference to FIG. 4 is simplified for the purpose of the present explanation and other steps and substeps may be included. A new touch event can be detected at step 202 after the prior touch event has ended at step 218. Alternatively, some of the steps and substeps may be excluded.

A ratio of distance of movement of the touch event to the distance of movement of the navigation indicator within the GUI can differ. The distance of movement of the navigation indicator can be based on a fixed multiple of the distance of movement of the location of touch, can be user-selectable, or can be variable. In embodiments, the ratio of distance of movement of the touch event to the distance of movement of the navigation indicator within the GUI can be dependent on the speed of movement of the location of touch. Thus, the speed of movement of the location of touch is determined and the ratio of distance of movement of the location of touch to the distance of movement of the navigation indicator within the GUI changes with speed of movement. For example, a faster movement of the location of touch can result in a greater distance of movement of the navigation indicator within the GUI. In other embodiments, the ratio of distance of movement of the location of touch to the distance of movement of the navigation indicator within the GUI can be dependent on the distance of the navigation indicator from the location of touch. For example, the ratio can decrease with increased distance of the navigation indicator from the location of touch.

Continued reference is made to FIG. 4 to describe an example of the method of controlling the electronic device, with reference also to FIGS. 2, and 5 to 8, which show front views of the portable electronic device 20 illustrating an example of a GUI. In the present embodiment, the touch screen display 38 is a capacitive touch screen display 38 as described above. As shown, the GUI in the present example provides the list of user-selectable features in the form of messages and each message in the list of messages 96 can be selected for opening for viewing content, for example.

A touch event is detected upon user touching of the touch screen display 38. Thus, signals are sent from the touch-sensitive overlay 34 to the controller 36 and the X and Y location of the touch are determined (step 202). For the purpose of the present example, the location of touch is determined to be at one of the messages in the list of messages 96. In the present example, the location of touch is determined to be at the location indicated by the numeral 118 in FIG. 5. In response to detecting the touch event and determination of the X and Y location of the touch, the navigation indicator, in the form of highlighting is rendered (step 204). The highlighting is rendered at the message 120 in the list of messages 96 at which the location of touch is determined on the touch screen display 38.

Next it is determined if there is a change in the location of touch (step 206). For the purpose of the present example, the location of touch has changed from the position illustrated in FIG. 5 (and shown in ghost outline in FIG. 6) to the second location of touch 122 shown in FIG. 6 while touch contact is maintained with the touch screen display 38. The X and Y location of touch is determined and compared to the previously determined X and Y location and the change in the X and Y location is determined. In the present example, there is a change in the Y location of the touch as indicated generally by the arrow 124. The location of the touch is thereby monitored to determine any changes during the touch event.

Figure 6:
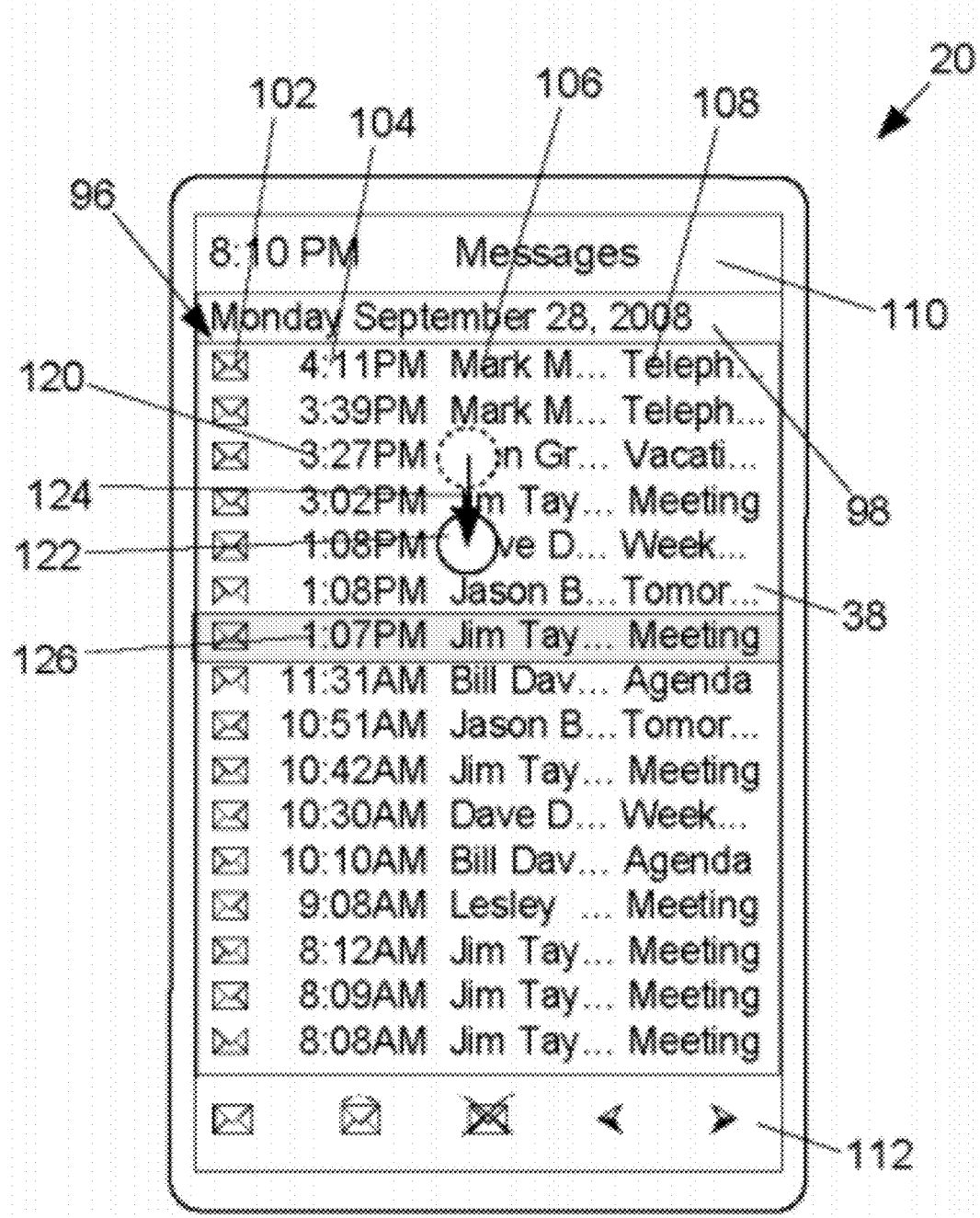

In response to determination of the change in the location of the touch at step 206, the distance of change is determined based on the difference between the X and Y location previously determined and the new X and Y location of touch. The direction of change is also determined based on the same X and Y values (step 208). The highlighting is then moved relative the graphical user interface (GUI) by, for example, scrolling highlighting through the list of messages 96 (step 210). As shown in FIG. 6, the highlighting is moved to the message indicated by the numeral 126. The message 126 is not the message at which the location of touch moved to. Instead, the message 126 that the highlighting moved to is located a greater distance from the first message highlighted 120 (shown in FIG. 5) within the GUI than the distance of the movement of the touch event on the touch screen display 38 from the first location of touch 118 (FIG. 5) to the second location of touch 122. For example purposes, the highlighting is moved twice the distance in the graphical user interface as the location of touch moves on the touch screen display 38. Thus, the navigation indicator is moved within the portion of the graphical user interface that includes the list of messages 96.

Continuing with the present example, confirmation of selection is not received at step 212 and it is determined at step 216 that the touch event has not ended. Therefore the process returns to step 206 and a further change in the location of touch can be detected.

Figure 7:
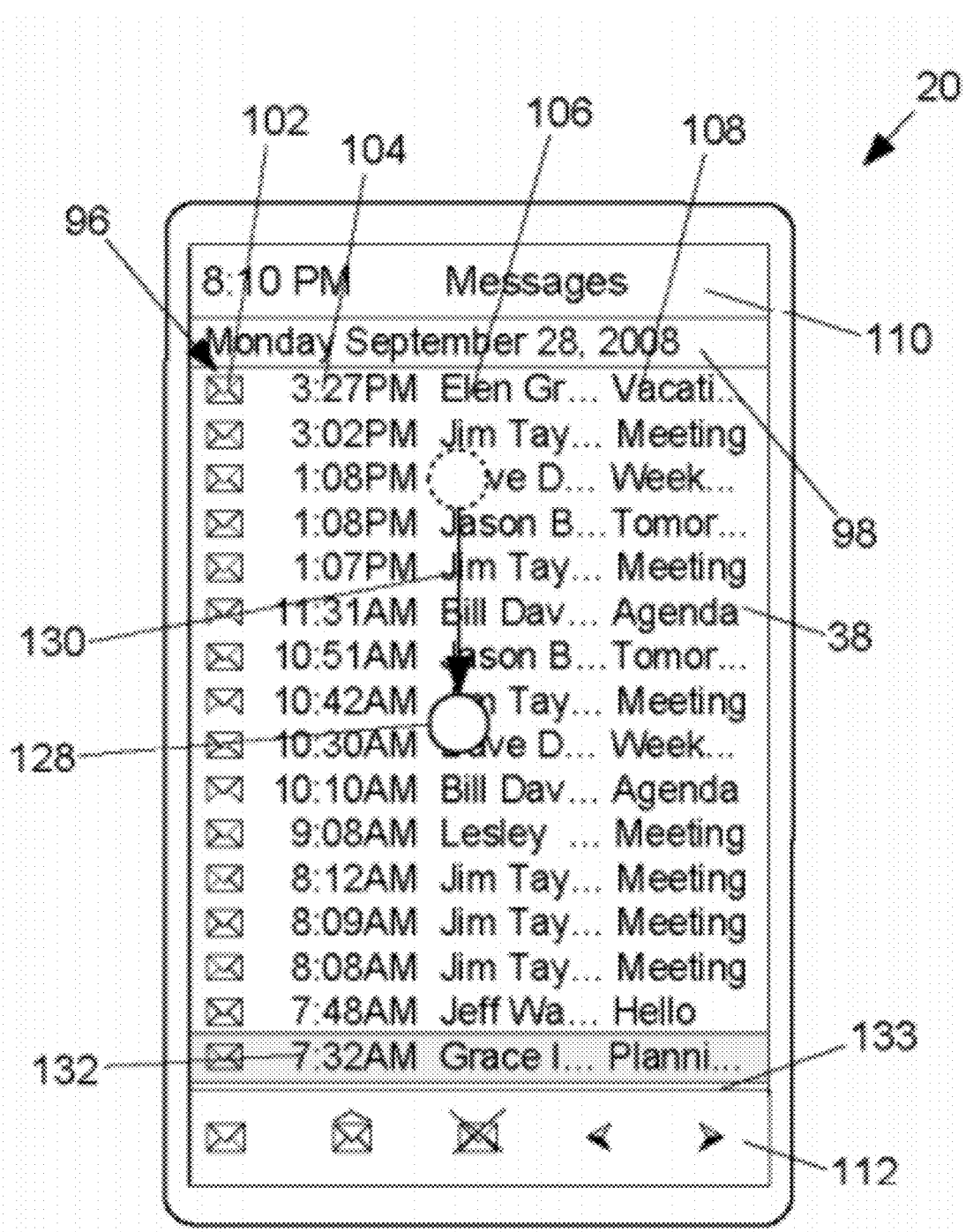

Referring now to FIGS. 6 and 7, it is determined if there is a change in the location of touch (step 206). For the purpose of the present example, the location of touch has changed from the position illustrated in FIG. 6 (and shown in ghost outline in FIG. 7) to the further location of touch 128 shown in FIG. 7 while touch contact is maintained with the touch screen display 38. The X and Y location of touch is determined and compared to the previously determined X and Y location from step 206 described above with reference to FIG. 6 and the change in the X and Y location is determined. In the present example, there is a change in the Y location of the touch as indicated generally by the arrow 130. The location of the touch is thereby monitored to determine any changes during the touch event.

In response to determination of the change in the location of the touch at step 206, the distance of change is determined based on the difference between the X and Y location determined previously and the new X and Y location of touch. The direction of change is also determined based on the same X and Y values (step 208). The highlighting is then moved relative the graphical user interface (GUI) by scrolling the highlighting through the list of messages 96 (step 210). As shown in FIG. 7, the highlighting is moved to the message indicated by the numeral 132. As indicated, the highlighting moves within the GUI about twice the distance of movement of the location of touch on the touch screen display 38 in the present example. With the movement of the location of touch in the generally downward direction in the orientation shown in FIGS. 6 and 7, the highlighting moves generally in the downward direction in the GUI from the location shown in FIG. 6 to the location shown in FIG. 7. The highlighting reaches an edge 133 of the portion of the GUI that includes the list of messages 96 rendered in FIG. 6 in the present example, therefore highlighting the final message in the list. With continued movement of the location of touch in the downward direction in the orientation in the present example, the list of messages scrolls upwardly while the highlighting continues to highlight the message adjacent the edge 133, thereby continuing relative movement of the highlighting within the GUI. Thus, while the location of the highlighting with respect to the physical touch screen display 38 does not change after the highlighting reaches the edge 133 of the list of messages 96, the relative location within the list of messages in the GUI continues to change with continued movement of the location of touch. The navigation indicator is thereby moved within the portion of the graphical user interface that includes the list of messages 96.

For the purpose of the present example, confirmation of selection is not received at step 212 and the user maintains touch contact with the touch screen display 38, therefore not ending the touch event (step 216). The process again returns to step 206 and a further change in the location of touch can be detected.

Figure 8:
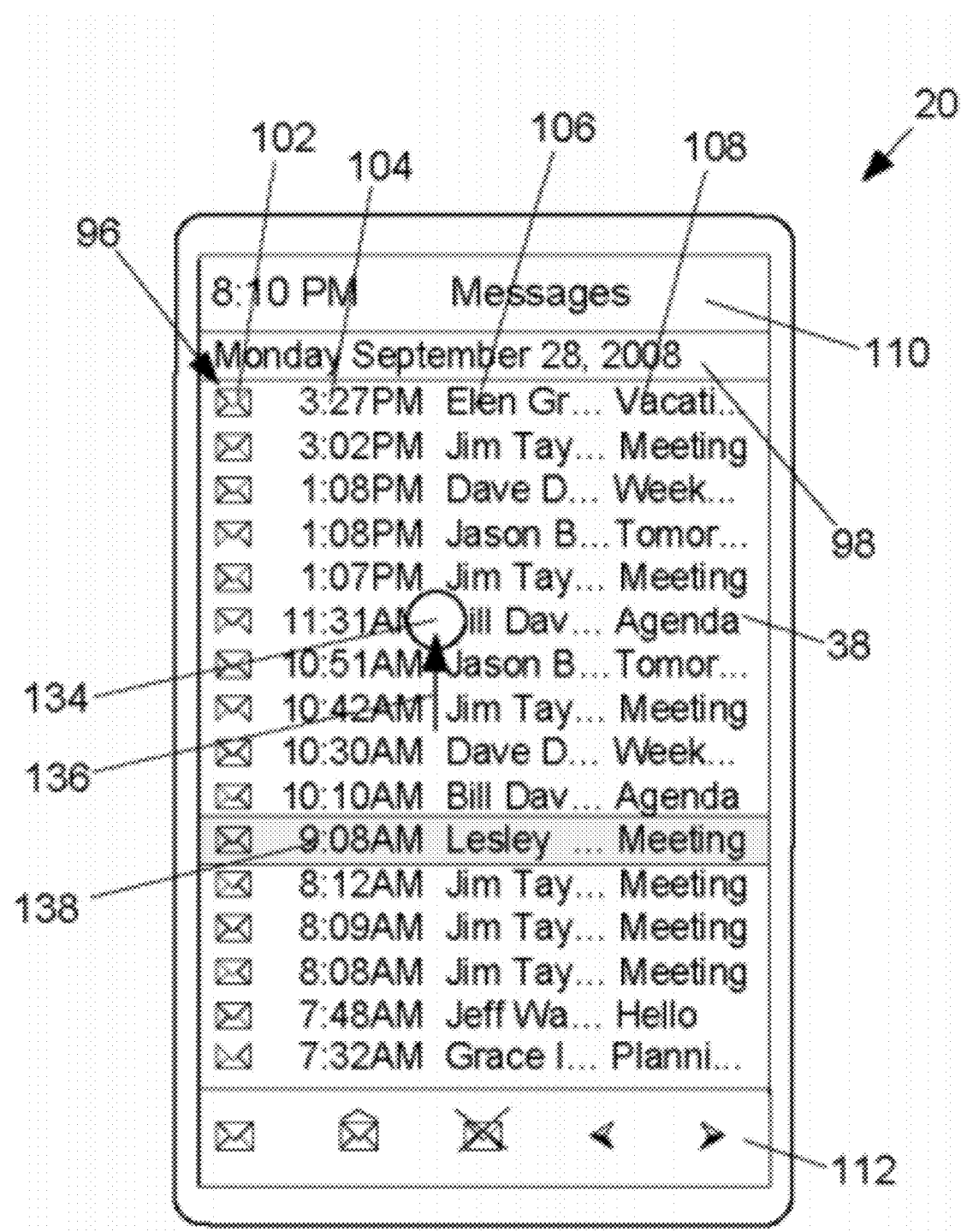

Referring now to FIGS. 7 and 8, it is determined that there is a change in the location of touch (step 206). For the purpose of the present example, the location of touch has changed from the position illustrated in FIG. 7 to the further location of touch 134 shown in FIG. 8 while touch contact is maintained with the touch screen display 38. The X and Y location of touch is determined and compared to the previously determined X and Y location from step 206 described above with reference to FIG. 7 and the change in the X and Y location is determined. In the present example, there is a change in the Y location of the touch as indicated generally by the arrow 136. The location of the touch is thereby monitored to determine any changes during the touch event.

In response to determination of the change in the location of the touch at step 206, the distance of change is determined based on the difference between the X and Y location determined previously and the new X and Y location of touch. The direction of change is also determined based on the same X and Y values (step 208). The highlighting is then moved relative the graphical user interface (GUI) by scrolling the highlighting through the list of messages 96 (step 210). As shown in FIG. 8, the highlighting is moved to the message indicated by the numeral 138. In the present example, the highlighting moves within the GUI about twice the distance of movement of the location of touch on the touch screen display 38. With the movement of the location of touch in the generally upward direction in the orientation shown in FIGS. 7 and 8, the highlighting moves generally in the upward direction in the GUI from the location shown in FIG. 7 to the location shown in FIG. 8.

For the purpose of the present example, the switch 39 is actuated as a result of depression of the touch screen display 38 with sufficient force to cause movement of the touch screen display 39 in the form of pivoting, against the bias of the touch screen display and against the actuation force of the switch 39, thereby confirming selection. This actuation is detected (step 212) and the message highlighted at the time of release of the switch 39 is opened to display message details (step 214).

In the above-described examples, the navigation indicator is highlighting in a list of messages. The present disclosure is not limited to highlighting as other navigation indicators are possible including, for example, a cursor, a pointer or any other suitable navigation indicator. Further, the present disclosure is not limited to a list of messages as the graphical user interface can be any suitable graphical user interface such as other lists, icons, or text.

Figure 9:
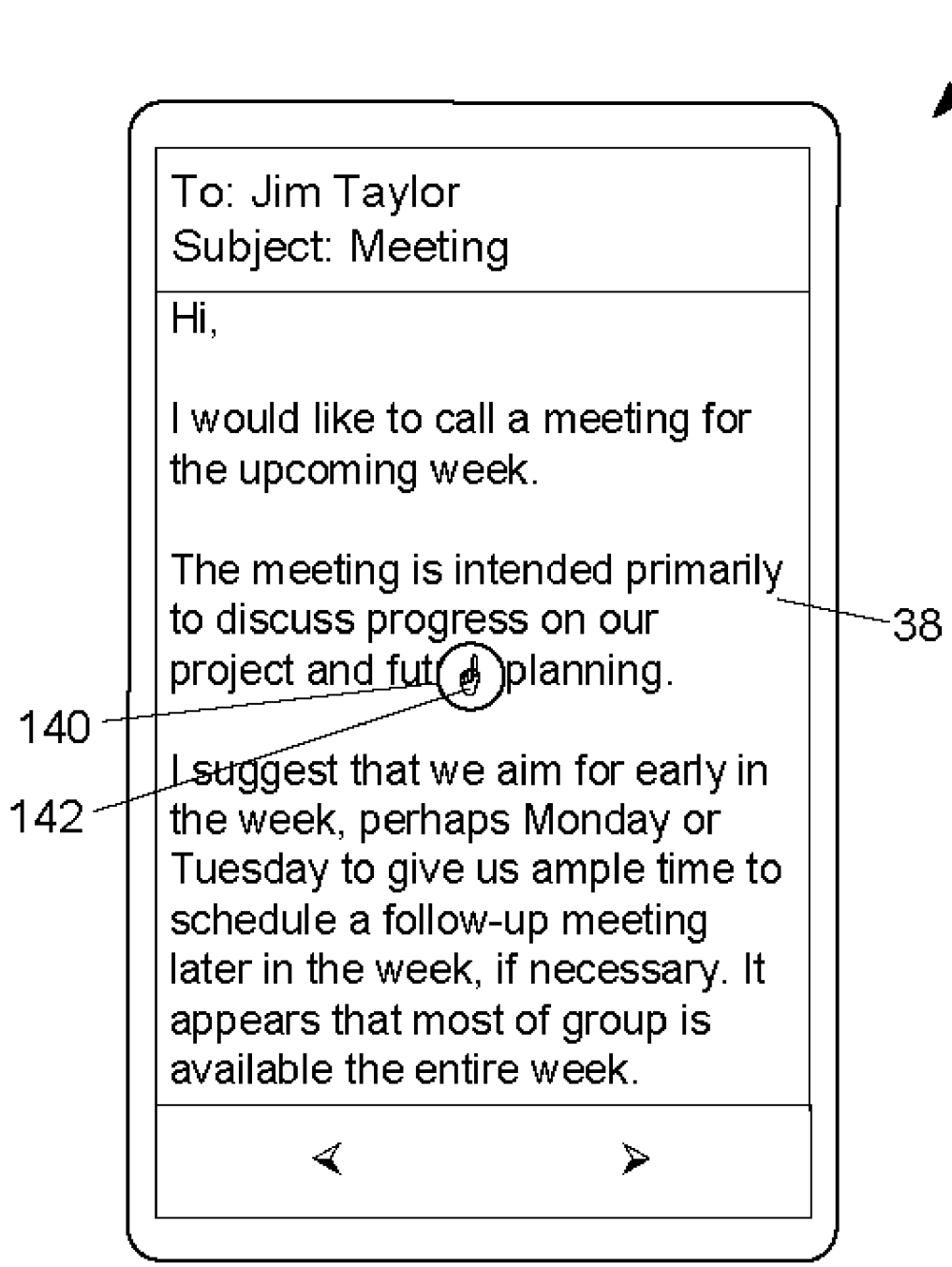
FIGS. 9 and 10 are front views of the portable electronic device of FIG. 2 illustrating another example of a graphical user interface performing steps of the method of FIG. 4.
Figure 10:
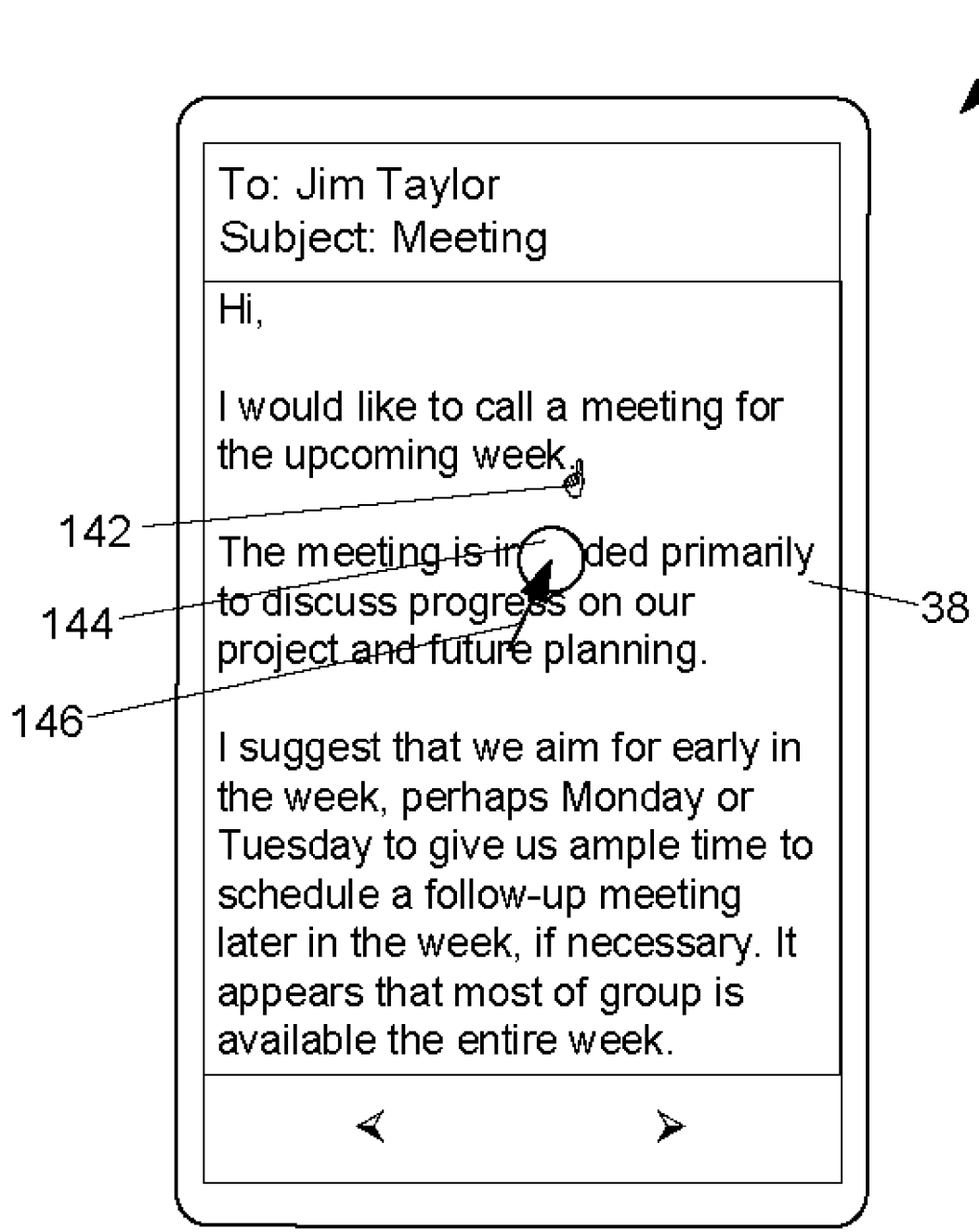

Reference is now made to FIGS. 9 and 10 to describe another example of the method of FIG. 4. FIGS. 9 and 10 show front views of the portable electronic device 20 illustrating a further example of a GUI. As shown, the GUI in the present example provides text. For example, the text can be text of a message for sending from the portable electronic device 20.

A touch event is detected upon user touching of the touch screen display 38. Thus, signals are sent from the touch-sensitive overlay 34 to the controller 36 and the X and Y location of the touch are determined (step 202). For the purpose of the present example, the location of touch is determined to be at a location within the text as indicated by the numeral 140 in FIG. 9. In response to detecting the touch event and determination of the X and Y location of the touch, the navigation indicator, in the form of a pointer 142 is rendered (step 204). The pointer 142 is rendered in the text at the location at which the touch is determined on the touch screen display 38. It will be appreciated that the pointer 142 is initially located under the finger of the user in FIG. 9.

Next it is determined if there is a change in the location of touch (step 206). For the purpose of the present example, the location of touch has changed from the position illustrated in FIG. 9 to the second location of touch 144 shown in FIG. 10 while touch contact is maintained with the touch screen display 38. The X and Y location of touch is determined and compared to the previously determined X and Y location and the change in the X and Y location is determined. In the present example, there is a change in the Y location of the touch as indicated generally by the arrow 146. The location of the touch is thereby monitored to determine any changes during the touch event.

In response to determination of the change in the location of the touch at step 206, the distance of change is determined based on the difference between the previously determined X and Y location of touch and the new X and Y location of touch. The direction of change is also determined based on the same X and Y values (step 208). The pointer 142 is then moved relative to the graphical user interface (GUI) in the text (step 210). As shown in FIG. 10, the pointer 142 is moved in the same direction as the direction of the movement of the touch. The pointer 142, however, is moved within the GUI to a location that is a greater distance from the previous location of the pointer 142 (shown in FIG. 9) than the distance on the touch screen display 38 from the first location of touch 140 (FIG. 9) to the second location of touch 144.

Continuing with the present example, confirmation of selection is received at step 212 as the switch 39 is actuated as described above and a function is performed. In the present example, the function performed is to provide a cursor at the location of the pointer 144 in the text, for example, for insertion of further text (step 214).

Figure 11:
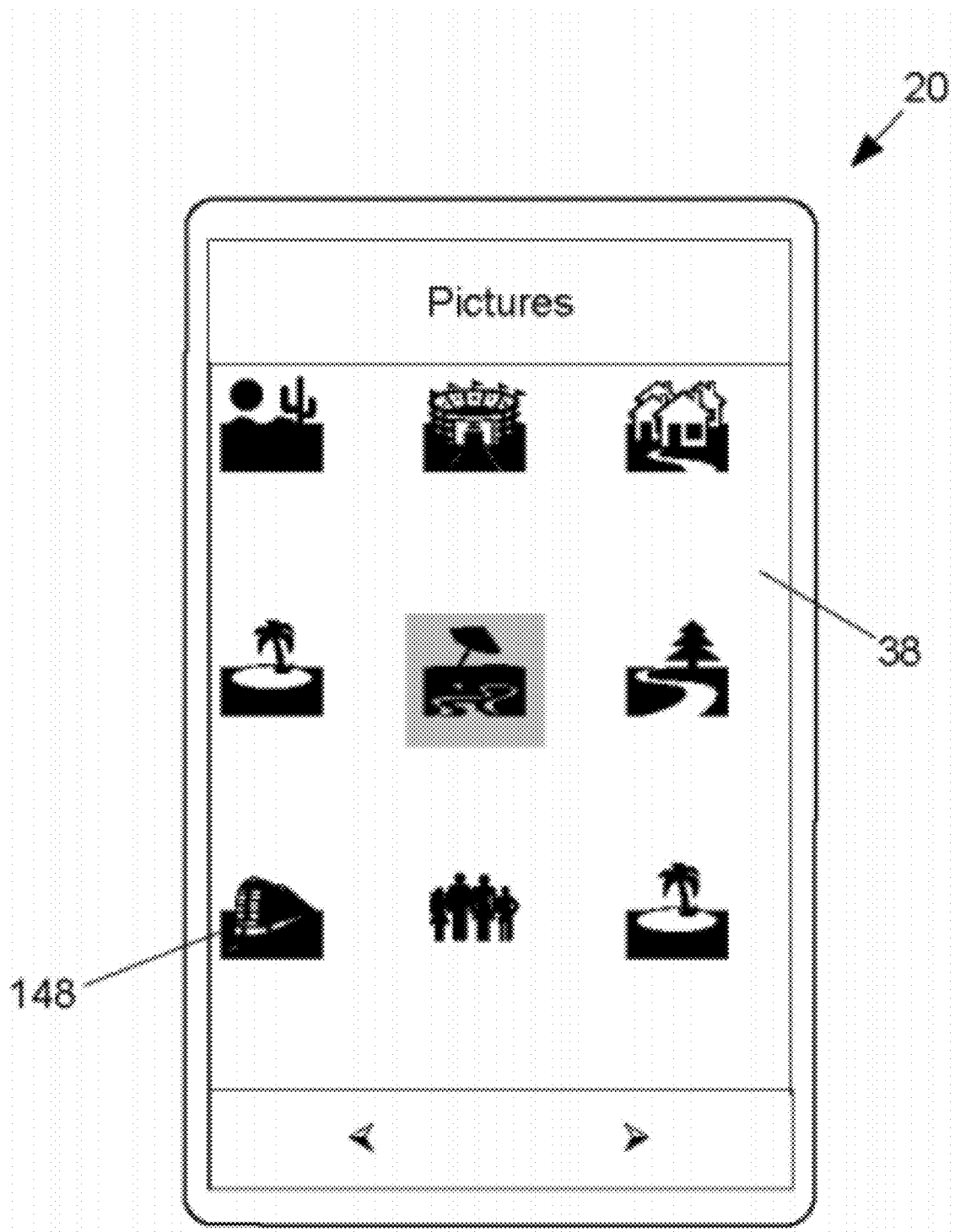
FIG. 11 is a front view of the portable electronic device of FIG. 2 showing yet another example of a graphical user interface executing a step in the method of FIG. 4.

As indicated above, the present disclosure is not limited to a list of messages as the graphical user interface can be any suitable graphical user interface such as other lists, icons, or text. FIG. 11 shows an example of a GUI including thumbnail pictures 148. The method as described with reference to FIG. 4 can also be used for selection of one of the thumbnail pictures 148, for example. The steps as described above are therefore carried out for selection of one of the thumbnail pictures 148. These steps are described herein with reference to other examples and therefore these steps need not be further described in relation to FIG. 11.

Figure 12:
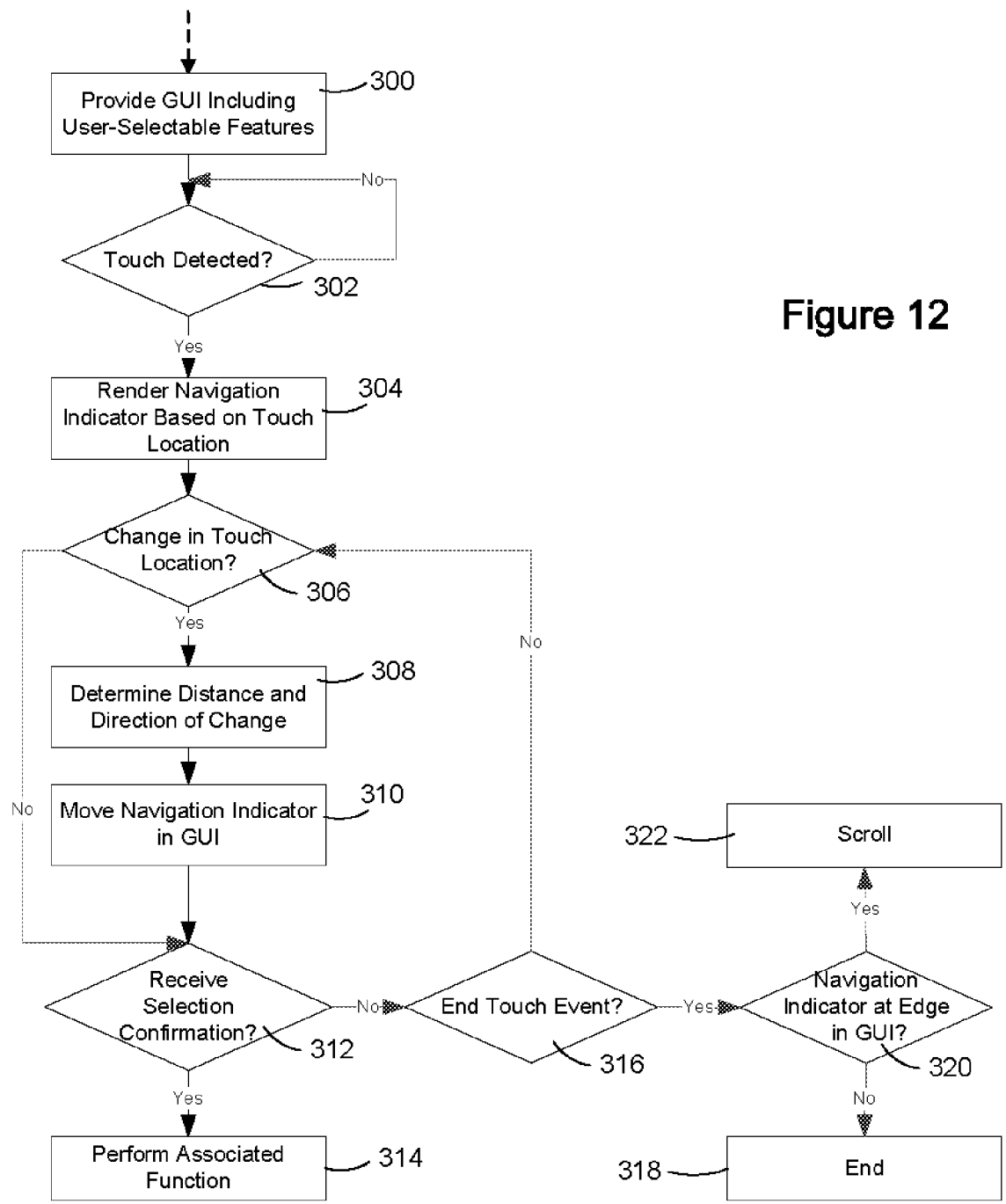
FIG. 12 is a flow chart showing a method for controlling a portable electronic device according to another example embodiment.

Reference is now made to FIG. 12 to describe a method for controlling a portable electronic device according to another example embodiment. Steps 300 to 316 are similar to steps 200 to 216 of FIG. 4 and therefore these steps are not described again herein. If it is determined that the touch event has ended at step 316, however the process proceeds to step 320 where it is determined if the navigation indicator is adjacent an edge within the GUI. If the navigation indicator is not adjacent the edge of the portion of the GUI, the process ends at step 318. The edge can be an edge of a portion of the GUI including a list of messages, contacts, calendar events, text, thumbnail images, or any other suitable features. For example, in the GUI shown in FIG. 7, the highlighting is adjacent the edge of the portion of the GUI that includes the list of messages. In the present example embodiment, the features can continue to scroll after the end of the touch event (step 322) if it is determined that the navigation indicator is adjacent the edge. Referring again to the example of FIG. 7, when the highlighting reaches an edge 133 of the portion of the GUI that includes the list of messages 96, the list of messages scrolls upwardly while the highlighting continues to highlight the message adjacent the edge 133, thereby continuing relative movement of the highlighting within the GUI as described with reference to FIG. 4. In the present example, however, the scrolling can continue even when the user ends the touch event by, for example, lifting the finger from the touch screen display 38. The speed of scrolling at step 322 can be fixed at a suitable speed or can be dependent on other features. For example, the speed of scrolling can be dependent on the speed of change in touch location prior to the end of the touch event, therefore requiring a determination of the speed of change prior to the end of the touch event. Scrolling can continue until the end of the list, text or thumbnails is reached or can continue for a suitable length of time or number of features. For example, scrolling can continue for a predefined number of features, or for a number of features based on the speed of scrolling prior to ending the touch event. Scrolling can end when a further touch event is detected.

According to one aspect there is provided a method of controlling a portable electronic device that has a touch screen display. The method includes providing a graphical user interface on a touch screen display, detecting a touch event at a first location on the touch screen display, providing a navigation indicator in the graphical user interface in response to detecting the touch event at the first location, and in response to detecting movement of the touch event from the first location to a second location while touch contact is maintained on the touch screen display, changing the position of the navigation indicator in the graphical user interface by a distance that is greater than a distance of movement of the touch event on the touch screen display, a direction of change of position of the navigation indicator is based on a direction of movement of the touch event on the touch screen display.

According to another aspect there is provided a portable electronic device. The portable electronic device includes a touch screen display and functional components. The functional components include a processor connected to the touch screen display, and a memory device for storage of computer-readable program code executable by the processor for providing a graphical user interface on the touch screen display, detecting a touch event at a first location on the touch screen display, providing a navigation indicator in the graphical user interface in response to detecting the touch event at the first location, and in response to detecting movement of the touch event from the first location to a second location while touch contact is maintained on the touch screen display, changing the position of the navigation indicator in the graphical user interface by a distance that is greater than a distance of movement of the touch event on the touch screen display, a direction of change of position of the navigation indicator is based on a direction of movement of the touch event on the touch screen display.

According to another aspect, there is provided a computer-readable medium. The computer-readable medium has computer-readable code embodied therein for execution by a processor of a portable electronic device for providing a graphical user interface on a touch screen display, detecting a touch event at a first location on the touch screen display, providing a navigation indicator in the graphical user interface in response to detecting the touch event at the first location, and in response to detecting movement of the touch event from the first location to a second location while touch contact is maintained on the touch screen display, changing the position of the navigation indicator in the graphical user interface by a distance that is greater than a distance of movement of the touch event on the touch screen display, a direction of change of position of the navigation indicator is based on a direction of movement of the touch event on the touch screen display.

A user can scroll through a list, for example, by moving a finger in touch contact with the touch screen display. The action of touching the touch screen display and moving the touch location by, for example, moving the finger in contact with the touch screen display permits scrolling. The scrolling can be carried out in any suitable direction. This scrolling can be performed without any additional icons or menus rendered on the display. Thus, a greater area of the display can be used for a list such as a list of messages as further icons or menus for scrolling are not necessary. Furthermore, menu screens or pop-up windows need not be rendered, reducing the number of screens for rendering for user interaction. Additional devices such as a scroll wheel, trackball or buttons are not required for scrolling.

Further, a navigation indicator such as a cursor, pointer or highlighter can be moved out from under the finger touching the touch screen display for viewing by the user. Thus, the location of the navigation indicator is more easily viewed by the user, resulting in increased accuracy of selection. Further still, selection of a feature, for example, can be carried out upon receipt of a signal from a switch such as a button or dome-type switch disposed between the touch screen display and a base of the portable electronic device. Thus, a user pressing on the touch screen display with enough force to depress the touch screen display and to overcome a minimum force for actuation, causes actuation of the button or dome-type switch for selection. Incorrect selections and entry can thereby be significantly reduced. It will also be appreciated that the switch provides a desirable tactile feedback in the form of a button-type click feel for to the user, aiding the user in determining when a selection has been made and further reducing the chance of erroneous input. Reduction of incorrect entries saves device use time required for correction, thereby reducing power requirements and increasing user satisfaction.

While the embodiments described herein are directed to particular implementations of the portable electronic device and the method of controlling the portable electronic device, it will be understood that modifications and variations may occur to those skilled in the art. All such modifications and variations are believed to be within the sphere and scope of the present disclosure.

The invention claimed is:

1. A method of controlling a portable electronic device having a touch screen display, the method comprising:
   providing a graphical user interface on the touch screen display;
   detecting a touch event at a first location on the touch screen display;
   providing a navigation indicator in the graphical user interface in response to detecting the touch event at the first location; and
   in response to detecting movement of the touch event from the first location to a second location while touch contact is maintained on the touch screen display, changing a position of the navigation indicator in the graphical user interface by moving the navigation indicator relative to at least a portion of the graphical user interface,
   wherein the position of the navigation indicator is changed by a distance that is based on a ratio of distance of movement of the touch event on the touch screen display to distance of movement of the navigation indicator and is greater than the distance of movement of the touch event, and
   wherein a direction of change of the position of the navigation indicator is based on a direction of movement of the touch event on the touch screen display.

2. The method according to claim 1, wherein moving the navigation indicator relative to the portion of the graphical user interface comprises scrolling said portion of the graphical user interface when the navigation indicator reaches an edge of said portion.

3. The method according to claim 2, wherein moving the navigation indicator relative to the portion of the graphical user interface comprises moving the navigation indicator relative to the touch screen display prior to the navigation indicator reaching the edge.

4. The method according to claim 1, comprising selecting a feature at the navigation indicator in response to receipt of an input from a switch actuated as a result of movement of the touch screen display relative to a remainder of the portable electronic device.

5. The method according to claim 4, comprising performing a function in response to receipt of said input.

6. The method according to claim 1, wherein the ratio is fixed and the distance of change of the position of the navigation indicator in the graphical user interface is based on a fixed multiple of the distance of movement of the touch.

7. The method according to claim 1, wherein ratio is a variable ratio of the distance of movement of the touch event to the distance of change of the position of the navigation indicator.

8. The method according to claim 7, wherein the variable ratio depends on a distance of the navigation indicator from the touch event.

9. The method according to claim 7, comprising determining a speed of movement of the touch event from the first location to a second location in response to detecting movement of the touch event from the first location to a second location while touch contact is maintained on the touch screen display.

10. The method according to claim 9, wherein the variable ratio depends on the speed of movement of the touch event.

11. The method according to claim 1, wherein said navigation indicator comprises a cursor or highlighting.

12. A portable electronic device comprising:
   a touch screen display; and
   a processor-coupled to the touch screen display, and
   a memory device for storage of computer-readable program code executable by the processor for
   providing a graphical user interface on the touch screen display, detecting a touch event at a first location on the touch screen display,
   providing a navigation indicator in the graphical user interface in response to detecting the touch event at the first location, and in response to detecting movement of the touch event from the first location to a second location while touch contact is maintained on the touch screen display, changing a position of the navigation indicator in the graphical user interface by moving the navigation indicator relative to at least a portion of the graphical user interface, wherein the position of the navigation indicator is changed by a distance that is based on a ratio of the distance of movement of the touch event on the touch screen display to the distance of change of position of the navigation indicator and is greater than a distance of movement of the touch event, wherein a direction of change of the position of the navigation indicator is based on a direction of movement of the touch event on the touch screen display.

13. A non-transitory computer-readable medium having computer-readable code embodied therein for execution by a processor of a portable electronic device for providing a graphical user interface on a touch screen display, detecting a touch event at a first location on the touch screen display, providing a navigation indicator in the graphical user interface in response to detecting the touch event at the first location, and in response to detecting movement of the touch event from the first location to a second location while touch contact is maintained on the touch screen display, changing a position of the navigation indicator in the graphical user interface by moving the navigation indicator relative to at least a portion of the graphical user interface, wherein the position of the navigation indicator is changed by a distance that is based on a ratio of the distance of movement of the touch event on the touch screen display to the distance of change of position of the navigation indicator and greater than a distance of movement of the touch, wherein a direction of change of position of the navigation indicator is based on a direction of movement of the touch event on the touch screen display.

* * * * *